US011028312B2

United States Patent
Li et al.

(10) Patent No.: US 11,028,312 B2
(45) Date of Patent: *Jun. 8, 2021

(54) TREATING SEAWATER FOR HYDROCARBON PRODUCTION

(71) Applicant: Saudi Arabian Oil Company, Dhahran (SA)

(72) Inventors: Leiming Li, Sugar Land, TX (US); Hejian Sun, Houston, TX (US); Feng Liang, Cypress, TX (US); Mohammed A. Bataweel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,644

(22) Filed: Oct. 18, 2019

(65) Prior Publication Data

US 2020/0048529 A1     Feb. 13, 2020

Related U.S. Application Data (63) Continuation of application No. 16/253,800, filed on Jan. 22, 2019, now Pat. No. 10,501,680.

(60) Provisional application No. 62/620,915, filed on Jan. 23, 2018.

(51) Int. Cl.
| | |
|---|---|
| *C09K 8/532* | (2006.01) |
| *C09K 8/66* | (2006.01) |
| *E21B 43/26* | (2006.01) |
| *C09K 8/80* | (2006.01) |
| *E21B 43/28* | (2006.01) |

(52) U.S. Cl.
CPC ............... *C09K 8/532* (2013.01); *C09K 8/66* (2013.01); *C09K 8/665* (2013.01); *E21B 43/26* (2013.01); *E21B 43/283* (2013.01); *C09K 8/80* (2013.01)

(58) Field of Classification Search
CPC .... E21B 43/28; E21B 2049/085; E21B 43/26; E21B 37/06; E21B 43/168
See application file for complete search history.

(56) References Cited

U.S. PATENT DOCUMENTS

| | | |
|---|---|---|
| 6,478,971 B1 | 11/2002 | Koefod et al. |
| 6,663,778 B1 | 12/2003 | Bader |
| 7,093,663 B1 | 8/2006 | Bader |
| 7,198,722 B2 | 4/2007 | Hussain |
| 8,012,358 B2 | 9/2011 | Salbaugh et al. |
| 8,815,096 B2 | 8/2014 | Zuback et al. |
| 8,834,726 B2 | 9/2014 | Keister |
| 9,085,477 B2 | 7/2015 | Banerjee et al. |
| 9,266,754 B2 | 2/2016 | Fazrie et al. |

(Continued)

FOREIGN PATENT DOCUMENTS

| | | |
|---|---|---|
| WO | WO 2012087887 | 6/2012 |
| WO | WO 2013041633 | 3/2013 |
| WO | WO 2017049039 | 3/2017 |

OTHER PUBLICATIONS

Gulf Cooperation Council Examination Report issued in GCC Application GC 2019-36895 dated May 17, 2020, 3 pages.

(Continued)

*Primary Examiner* — Zakiya W Bates
(74) *Attorney, Agent, or Firm* — Fish & Richardson P.C.

(57) ABSTRACT

A system and method for hydraulic fracturing including mixing seawater with an additive to precipitate sulfate from the seawater and mixing a flocculating agent with the seawater to agglomerate the sulfate precipitates.

21 Claims, 8 Drawing Sheets

(56) References Cited

U.S. PATENT DOCUMENTS

| | | |
|---|---|---|
| 2012/0205313 A1 | 8/2012 | Sathrugnan et al. |
| 2013/0048562 A1 | 2/2013 | Keister |
| 2014/0158632 A1 | 6/2014 | Govind et al. |
| 2015/0083669 A1 | 3/2015 | Matherly et al. |
| 2016/0154133 A1 | 6/2016 | Donderici et al. |
| 2017/0197853 A1 | 7/2017 | Chudasama et al. |

OTHER PUBLICATIONS

International Search Report and Written Opinion issued in International Application No. PCT/US2019/014482 dated Mar. 22, 2019, 14 pages.

TREATING SEAWATER FOR HYDROCARBON PRODUCTION

CROSS-REFERENCE TO RELATED APPLICATION(S)

This application is a continuation of and claims the benefit of priority to U.S. application Ser. No. 16/253,800, filed Jan. 22, 2019, which claims the benefit of priority to U.S. Provisional Application Ser. No. 62/620,915, filed on Jan. 23, 2018, the contents of which are hereby incorporated by reference.

TECHNICAL FIELD

This specification relates to hydrocarbon production and hydraulic fracturing including treating seawater for the hydraulic fracturing fluid.

BACKGROUND

Hydraulic fracturing is a process of stimulating a well through one or more fractured rock formations. The process involves pressure injection of a fracturing fluid into a wellbore to create cracks (fractures), so that fluids can flow more freely through the rock formation. Hydraulic fracturing can increase the mobility of trapped hydrocarbons and therefore increase recovery of hydrocarbons from a reservoir. Fracturing fluid is commonly formulated with fresh water. However, fresh water can be costly and difficult to obtain in some production areas. Seawater, produced water, brine, or the like with total dissolved solids (TDS) as a base fluid for hydraulic fracturing can degrade in the resulting fracturing fluids at wellbore temperatures.

SUMMARY

An aspect is a method of hydraulic fracturing a geological formation, including receiving seawater for the hydraulic fracturing, the seawater having a sulfate concentration of at least 3000 milligrams per liter (mg/L). The method includes mixing an additive with the seawater to precipitate sulfate in the seawater, mixing a flocculating agent with the seawater to agglomerate sulfate precipitate in the seawater, removing sulfate precipitate from the seawater to give treated seawater, and injecting fracturing fluid having the treated seawater through a wellbore into the geological formation to hydraulically fracture the geological formation.

Another aspect is a method of hydraulic fracturing a geological formation, including forming a fracturing fluid from seawater, the seawater having a sulfate concentration of at least 3000 mg/L. The forming includes of the fracturing fluid includes mixing the seawater with an additive to form a first mixture to precipitate sulfate from the seawater, mixing the first mixture with a flocculating agent to form a second mixture to agglomerate the sulfate precipitates, and separating the second mixture from sulfate precipitates. The method includes delivering the fracturing fluid having the second mixture to a subterranean zone.

Yet another aspect relates to a hydraulic-fracturing system including a seawater treatment system having a mixer to combine an additive with seawater to precipitate sulfate in the seawater and to combine a flocculating agent with the seawater to agglomerate sulfate precipitate, the seawater treatment system to separate sulfate precipitate from the seawater to give treated seawater. The hydraulic-fracturing system includes a pump to inject fracturing fluid having the treated seawater through a wellbore into a geological formation to hydraulically fracture the geological formation.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

Concerns over depleting freshwater sources have led to the need to develop methods for utilizing available seawater for various oilfield applications. Hydraulic fracturing, for example, can require millions of gallons of water per treatment, so alternative sources are sought after. One of the main issues associated with using seawater directly with no treatment is the presence of sulfate ions in the fluid. When injected into a well, the sulfate can react with certain cations present in the rock and formation brine to produce scale such as calcium or barium sulfate, where the solid precipitate can have damaging effects upon the formation. Alternatively, sulfate introduced to the well can lead to toxic hydrogen sulfide ($H_2S$) production.

As described in this disclosure, seawater can be treated to remove sulfate ions. Laboratory experiments were performed in order to synthesize a compound which can react with sulfate. A series of tests were then carried out with a large range of concentrations of the reactant and sulfate-containing simulated seawater in order to determine the conditions under which the sulfate compound would precipitate. Various analytical techniques were used to confirm the identity of the crystallized compound as well as the residual sulfate concentration in solution post-crystallization.

The sulfate compound was synthesized over a range of conditions, including the concentration ranges of known seawater compositions. The crystallization of the product occurs rapidly (that is, within minutes) at high concentrations, whereas slower precipitation and larger crystals were formed over more dilute conditions. Furthermore, elemental analysis of the remaining solution demonstrated that it is possible for the residual concentration of sulfate to reach trace levels. The subject matter described in this specification can be implemented, so as to utilize salt water (such as seawater) rather than fresh water for fracturing fluids. The treated seawater can also have an increased viscosity (along viscosity lifetime and stability), which can enhance fracturing fluids. The sulfate precipitates removed from the seawater can also be utilized as weighting agents in oilfield applications.

Figure 1:
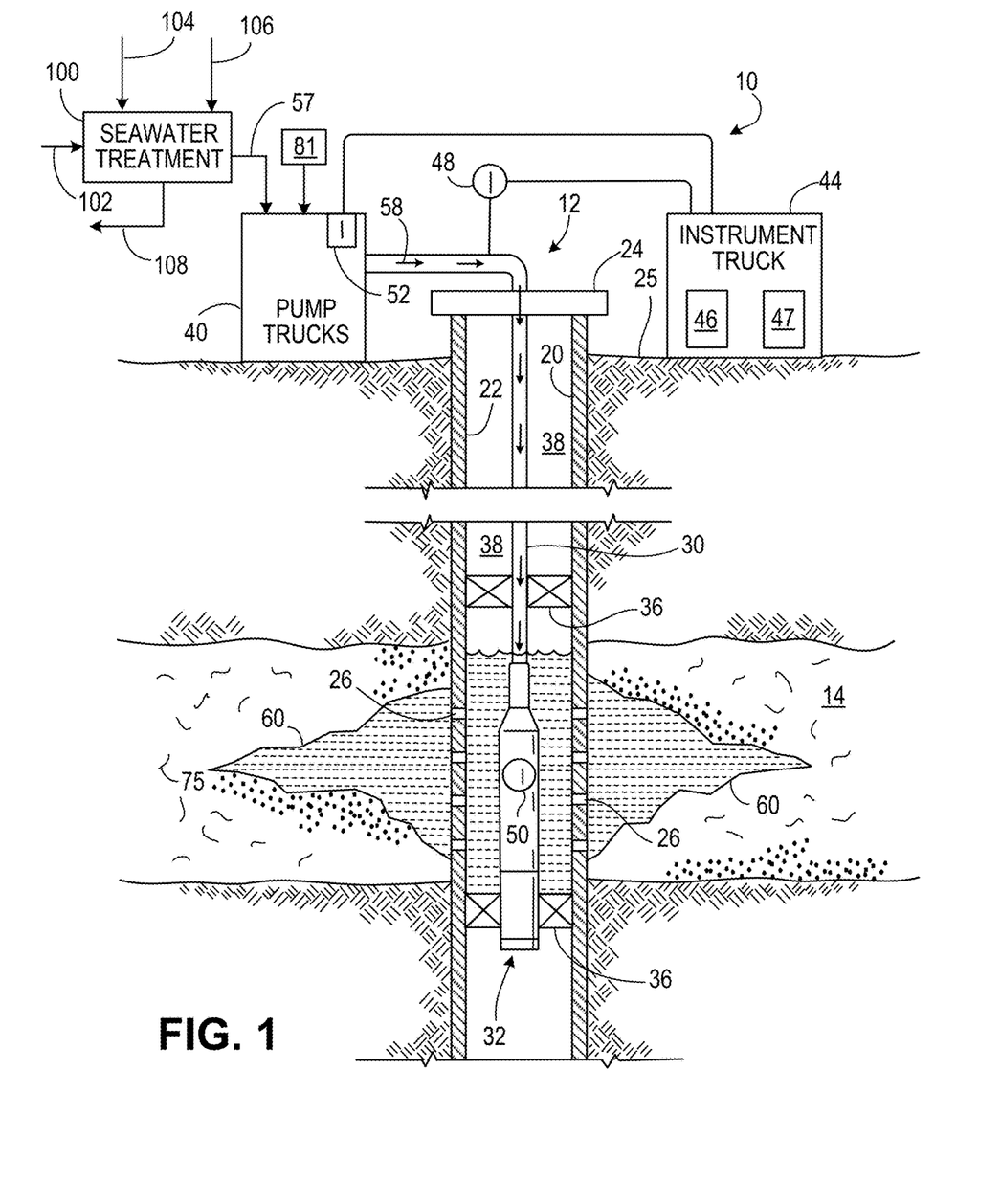
FIG. 1 is a schematic of an example of a fracture treatment for a well.

FIG. 1 illustrates an example of a fracture treatment 10 for a well 12. The well 12 can be in a well bore 20 formed in a subterranean zone 14 of a geological formation in the Earth crust. The subterranean zone 14 can include, for example, a formation, a portion of a formation, or multiple formations in a hydrocarbon-bearing reservoir from which recovery operations can be practiced to recover trapped hydrocarbons. Examples of unconventional reservoirs include tight-gas sands, gas and oil shales, coalbed methane, heavy oil and tar sands, gas-hydrate deposits, to name a few. In some implementations, the subterranean zone 14 includes an underground formation of naturally fractured rock containing hydrocarbons (for example, oil, gas, or both). For example, the subterranean zone 14 can include a fractured shale. In some implementations, the well 12 can intersect other suitable types of formations, including reservoirs that are not naturally fractured in any significant amount.

The well 12 can include a casing 22 and well head 24. The wellbore 20 can be a vertical, horizontal, deviated, or multilateral bore. The casing 22 can be cemented or otherwise suitably secured in the wellbore 20. Perforations 26 can be formed in the casing 22 at the level of the subterranean zone 14 to allow oil, gas, and by-products to flow into the well 12 and be produced to the surface 25. Perforations 26 can be formed using shape charges, a perforating gun, or otherwise.

For the fracture treatment 10, a work string 30 can be disposed in the well bore 20. The work string 30 can be coiled tubing, sectioned pipe, or other suitable tubing. A fracturing tool 32 can be coupled to an end of the work string 30. Packers 36 can seal an annulus 38 of the well bore 20 uphole of and downhole of the subterranean zone 14. Packers 36 can be mechanical, fluid inflatable, or other suitable packers.

One or more pump trucks 40 can be coupled to the work string 30 at the surface 25. The pump trucks 40 pump fracture fluid 58 down the work string 30 to perform the fracture treatment 10 and generate the fracture 60. The fracture 60 is generated in the rock 75 of the subterranean formation 14. The fracture fluid 58 can include a fluid pad, proppants, flush fluid, or a combination of these components. The fracture fluid 58 can include treated seawater 57, as discussed below. The pump trucks 40 can include mobile vehicles, equipment such as skids, or other suitable structures.

One or more instrument trucks 44 can also be provided at the surface 25. The instrument truck 44 can include a fracture control system 46 and a fracture simulator 47. The fracture control system 46 monitors and controls the fracture treatment 10. The fracture control system 46 can control the pump trucks 40 and fluid valves to stop and start the fracture treatment 10, as well as to stop and start the pad phase, proppant phase, and flush phase of the fracture treatment 10. The fracture control system 46 communicates with surface and subsurface instruments to monitor and control the fracture treatment 10. In some implementations, the surface and subsurface instruments may comprise surface sensors 48, down-hole sensors 50, and pump controls 52.

A quantity of energy applied by the fracture control system 46 to generate the fractures 60 in the subterranean zone 14 can be affected not only by the properties of the reservoir rock in the subterranean zone but also by the forming of scale in the subterranean zone as components of the fracture fluid 58 react with certain constituents present in the rock.

Chemical additives 81 can be mixed with fracture fluid 58 and flowed through the reservoir. Fracture fluid 58 can include treated seawater 57, such as seawater 102 having been treated to remove sulfate ions. The treated seawater 57 can have less than 0.02 molarity (M) of sulfate ions, less than 0.01 M of sulfate ions, less than 0.005 M sulfate ions, or a lower concentration of sulfate ions. For instance, the seawater can have been treated with additives that causes sulfate ions to precipitate from the seawater. The removal of sulfate ions from the seawater prior to use of the seawater in an oilfield operation can help prevent scale formation, thus reducing damage to the subterranean zone 14 and enabling larger amounts of hydrocarbons to be accessed.

In certain embodiments, the fracture treatment 10 includes a seawater treatment system 100 that receives and treats seawater 102 to give the treated seawater 57 as a base fluid in the fracture fluid 58. The seawater treatment system 100 includes equipment to precipitate sulfates and remove the precipitated sulfate from the seawater 102. Indeed, in operation, the seawater treatment system 100 removes sulfate from the seawater 102. In some implementations, the received seawater 102 does not include scale inhibitor and/or is untreated seawater. Further, the seawater 102 may include at least 3000 milligram per liter (mg/L) sulfate, or at least 4000 mg/L sulfate.

In operation, the seawater treatment system 58 mixes an additive 104 with the seawater 102 to precipitate sulfate in the seawater 102 to give sulfate precipitates in the seawater 102. The additive 104 may include, for example, barium chloride ($BaCl_2$) or calcium chloride ($CaCl_2$), or their hydrates such as barium chloride dihydrate ($BaCl_2.2H_2O$) or calcium chloride dihydrate ($CaCl_2.2H_2O$). In those examples, the sulfate precipitate particles may be barium sulfate ($BaSO_4$) or calcium sulfate ($CaSO_4$). The additive 104 stream may additionally include produced fluid to dissolve the additive 104, facilitate delivery and dispersion of the additive 104, and so on. In implementations, the produced fluid may be produced fluid from the well 12 or nearby well. The produced fluid in the additive 104 stream may include produced water, brine, brackish water, or combinations of these.

Furthermore, the seawater treatment system 100 may add a flocculant 106 (flocculating agent) to the seawater 102 to flocculate or agglomerate the sulfate precipitates. The agglomeration of sulfate precipitate particles can accelerate the settling of the precipitate and facilitate separating the sulfate precipitate 108 (e.g., $BaSO_4$, $CaSO_4$, etc.) from the seawater 102. Examples of flocculants 106 include cationic, anionic, and non-ionic polyacrylamides and acrylamide copolymers. In some implementations, coagulants can be added with the flocculant 106. Moreover, as the treated seawater 57 will be utilized as fracturing fluid for the well 12, the flocculant 106 can include a viscosifier (increases viscosity) or a friction reducer, or both. Again, the sulfate precipitates 108 are removed to give the treated seawater 57. Additionally, the treated seawater 57 may have the viscosifier or friction reducer. The treated seawater 57 can have a concentration of sulfate that is lower than a solubility level of sulfate in the treated seawater 57. In certain implementations, the treated seawater 57 has less than 200 mg/L sulfate, less than 190 mg/L, less than 100 mg/L sulfate, or less than 90 mg/L sulfate.

The seawater treatment system 100 may include mixers, vessels, settling tanks, clarifiers, separators, pumps, piping, controls, and the like, to precipitate sulfate and remove the sulfate precipitate from the seawater 102. For example, the system 100 may include piping to receive produced fluid and to incorporate the additive 104 into the produced fluid, and provide the produced fluid with the additive 104 to, for example, a mixer. Indeed, a mixer may combine the additive 104 with the seawater 102 and combine the flocculant with the seawater 102. In one implementation, the mixer is a vessel with an agitator. Furthermore, in certain embodiments, a settling vessel for the seawater 102 provides for the agglomerated sulfate precipitate to migrate to the bottom of the settling vessel to be removed via an outlet on a bottom portion of the settling vessel. A separator may be employed. In some implementations, the settling vessel is the vessel with the agitator (turned off) or is another vessel. The system 100 may include a pump as a motive device for flow of the treated seawater 57 to the pump trucks 40, and so on.

An embodiment is a hydraulic-fracturing system including a seawater treatment system having a mixer to combine an additive with seawater to precipitate sulfate in the seawater and to combine a flocculating agent with the seawater to agglomerate sulfate precipitate. In implementations, the system processes seawater having a sulfate concentration of at least 3000 milligrams per liter (mg/L). In certain examples, the seawater received is untreated seawater or does not have a scale inhibitor. Further, the system may be configured to receive produced fluid (e.g., produced water or brine) to incorporate the additive with the seawater. The seawater treatment system separates sulfate precipitate from the seawater to give treated seawater (e.g., sulfate concentration less than 90 mg/L). Moreover, system may incorporate a viscosifier or friction reducer, or both, with the flocculating agent such that the treated seawater has the viscosifier or the friction reducer, or both. The hydraulic-fracturing system includes a pump to inject fracturing fluid having the treated seawater through a wellbore into a geological formation to hydraulically fracture the geological formation.

Figure 2A:
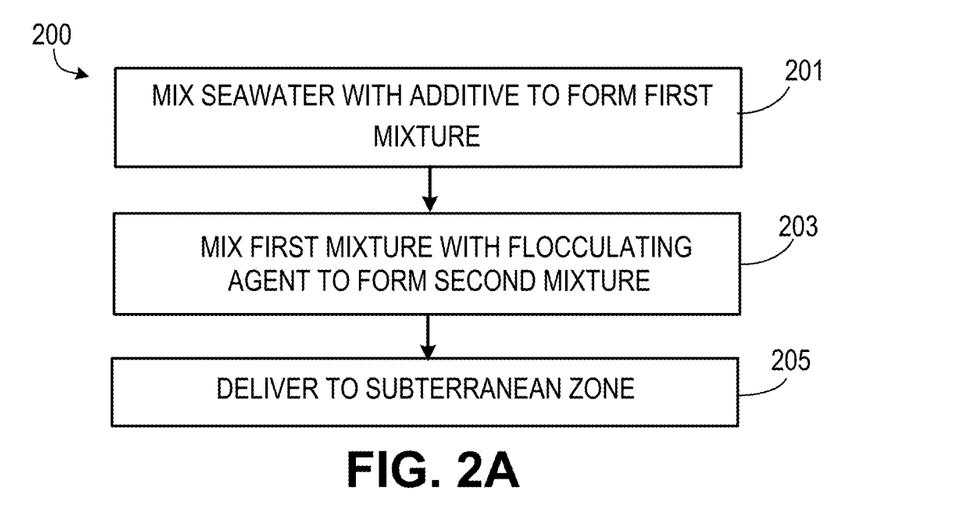
FIG. 2A is a flow chart of an example method for hydraulic fracturing including treating seawater.

FIG. 2A is a method 200 for treating seawater. At 201, seawater and an additive is mixed to form a first mixture. When mixed with the seawater, the additive causes sulfate to precipitate from the seawater. The additive can include produced water, brine, brackish water, or combinations of these. The additive can include a hydrate, a divalent cation, or combinations of these. For example, the additive can be a brine that contains dissolved barium ions ($Ba^{2+}$) or calcium ions ($Ca^{2+}$). The additive can be a hydrate, such as barium chloride dihydrate ($BaCl_2.2H_2O$) or calcium chloride dihydrate ($CaCl_2.2H_2O$). Produced water is water that occurs naturally within a rock (such as formation water) or water trapped in a rock during its formation (such as connate water), which can be produced from a well. In some implementations, the seawater utilized at 201 is untreated seawater. Untreated seawater is seawater that has not been substantially processed or treated to change the chemical properties of or to remove contaminants from the seawater between the moment the seawater is obtained and the moment the seawater is used. The term "substantially" as used in this disclosure refers to a majority of, or mostly, as in at least about 50 percent (%), 60%, 70%, 80%, 90%, 95%, 96%, 97%, 98%, 99%, 99.5%, 99.9%, 99.99%, or at least about 99.999% or more.

In some implementations, the seawater utilized at 201 has already been processed, for example, to remove contaminants from the seawater. In some implementations, the seawater does not include a scale inhibitor. A scale inhibitor is any component that can be added to a fluid to delay, reduce, or prevent scale deposition on equipment or piping. Some examples of scale inhibitors include acrylic acid polymers, maleic acid polymers, and phosphates. In some implementations, a salt is dissolved in the first mixture to increase a potential of hydrogen (pH) of the first mixture. The pH of the first mixture can be between 7 and 9. For example, sodium bicarbonate ($NaHCO_3$) can be dissolved in the first mixture to increase the pH of the first mixture to approximately 7. The term "approximately" as used in this disclosure refers to a deviation or allowance of up to 10%.

At 203, the first mixture is mixed with a flocculating agent to form a second mixture. The flocculating agent causes the sulfate precipitates to agglomerate. The agglomeration of sulfate precipitate particles can accelerate the settling of the precipitate and facilitate separating the precipitate from the second mixture. Flocculating agents can include a viscosifier (any compatible component that increases the viscosity of the fluid) and a friction reducer (any compatible component that alters the rheological properties of the fluid in a way such that friction created within the fluid as the fluid flows through restrictions is reduced). The flocculating agent can include a polymer, a copolymer, a hydrate such as aluminum sulfate hydrate ($Al2(SO4)3.H2O$), or combinations of these. Examples of suitable flocculating agents include cationic, anionic, and non-ionic polyacrylamides and acrylamide copolymers. In some implementations, coagulants can be used in conjunction with the flocculating agents, for example, a coagulant that includes aluminum or iron compounds can be also used with the flocculating agent. The second mixture can have a concentration of sulfate that is lower than a solubility level of sulfate in the second mixture. In certain implementations, the sulfate precipitates are separated from the second mixture. The second mixture with less or reduced sulfate precipitate (that is, sulfate precipitates have been separated from the second mixture) can be utilized as a fracturing fluid or as a base fluid of the fracturing fluid.

At 205, the fracturing fluid is delivered (e.g., through a wellbore) to a subterranean zone in a geological formation for hydraulic fracturing of the subterranean zone. For example, the fracturing fluid can be pumped downhole into the subterranean zone. The fracturing fluid can optionally be further processed before the fracturing fluid is delivered to the subterranean zone.

An embodiment is a method of hydraulic fracturing a geological formation, including forming a fracturing fluid from seawater having a sulfate concentration of at least 3000 milligrams per liter (mg/L). The forming of the fracturing fluid includes: mixing the seawater with an additive to form a first mixture to precipitate sulfate from the seawater; mixing the first mixture with a flocculating agent to form a second mixture to agglomerate the sulfate precipitates; and separating the second mixture from sulfate precipitates. The method includes delivering the fracturing fluid having the second mixture to a subterranean zone. In some implementations, the seawater does not include a scale inhibitor. In certain implementations, the seawater is untreated seawater. The forming of the fracturing fluid may include dissolving a salt in the first mixture, the salt configured to increase a potential of hydrogen (pH) of the first mixture. In certain implementations, the pH of the first mixture is between 7 and 9. In implementations, the additive is configured to precipitate crystalline sulfates. The additive may be a hydrate, a divalent cation, or combinations thereof. In a particular implementation, the hydrate is barium chloride dihydrate (BaCl2.2H2O), calcium chloride dihydrate (CaCl2.2H2O), or combinations thereof. The additive may include produced water, brine, brackish water, or combinations thereof. The flocculating agent may be a polymer, a copolymer, aluminum sulfate hydrate (Al2(SO4)3.H2O), or combinations thereof. The flocculating agent may include a viscosifier, a friction reducer, or combinations thereof.

Figure 2B:
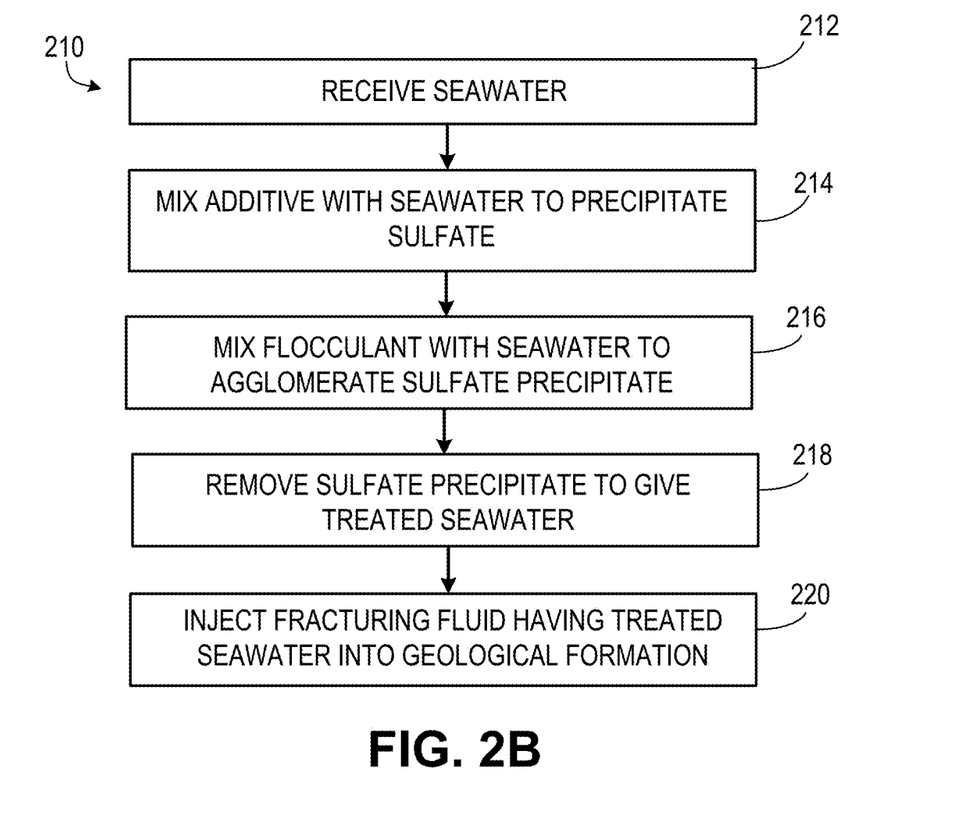
FIG. 2B is a flow chart of an example method for hydraulic fracturing including treating seawater.

FIG. 2B is a method 210 of hydraulic fracturing a geological formation in the Earth crust. At 212, the method includes receiving seawater. The seawater may have a sulfate concentration of at least 3000 mg/L. The seawater may be untreated seawater or have no scale inhibitor, or a combination thereof. In certain embodiments, the untreated seawater is received at a well site in which the hydraulic fracturing is being performed.

At 214, the method includes mixing an additive with the seawater to precipitate sulfate in the seawater. The additive may include or be, for example, barium chloride (BaCl2), calcium chloride (CaCl2), barium chloride dihydrate (BaCl2.2H2O), or calcium chloride dihydrate (CaCl2.2H2O), or any combinations thereof. In those examples, the sulfate precipitate is barium sulfate (BaSO4) or calcium sulfate (CaSO4), or a combination thereof. Moreover, the additive may include produced fluid (e.g., produced water, brine, etc.) from a well. For example, the additive may be added to the produced fluid and the additive/produced fluid stream added to the seawater.

At 216, the method includes mixing a flocculant or flocculating agent with the seawater to agglomerate the sulfate precipitate in the seawater. The flocculating agent stream added to the seawater may include a viscosifier or a friction reducer, or both, such that the treated seawater will include the viscosifier or the friction reducer. Indeed, the amount of viscosifier or friction reducer in the flocculating agent may be specified in view of the treated seawater as the fracturing fluid or a component of the fracturing fluid.

At 218, the method includes removing sulfate precipitate from the seawater to give the treated seawater. In one implementation, the sulfate precipitate agglomerated via the flocculant settles to a bottom portion of a vessel for removal. In another implementation, a separator (e.g., centrifugal separator, weir separator, etc.) is employed to remove the agglomerated sulfate precipitate from the seawater to give the treated seawater. In a particular embodiment, the treated seawater has a sulfate concentration of less than 90 mg/L.

At 220, the method includes injecting fracturing fluid having the treated seawater through a wellbore into the geological formation to hydraulically fracture the geological formation. The fracturing fluid can include chemical additives. The fracturing fluid can also include proppants such as sand or other types of proppants. The fracturing fluid may be injected into the geological formation via multiple pumps.

An embodiment is a method of hydraulic fracturing a geological formation, including receiving seawater for the hydraulic fracturing and mixing an additive with the seawater to precipitate sulfate in the seawater. In implementations, the seawater may be received at the well site, and the additive mixed with the seawater at the well site. The received seawater may have a sulfate concentration of least 3000 mg/L sulfate concentration. The received seawater may be untreated seawater or have no scale inhibitor. The additive may include barium chloride (BaCl2), calcium chloride (CaCl2), barium chloride dihydrate (BaCl2.2H2O), or calcium chloride dihydrate (CaCl2.2H2O), or any combinations thereof, and wherein the sulfate precipitate is barium sulfate (BaSO4) or calcium sulfate (CaSO4), or a combination thereof. The additive may include produced fluid from a well. The method includes mixing a flocculating agent with the seawater (to agglomerate sulfate precipitate in the seawater) and removing sulfate precipitate from the seawater to give treated seawater. In one implementation, the treated seawater has a sulfate concentration of less than 90 mg/L. The flocculating agent may include a viscosifier or a friction reducer, or both, and wherein the treated seawater includes the viscosifier or the friction reducer, or both, via the flocculating agent. The method includes injecting fracturing fluid having the treated seawater through a wellbore at the well site into the geological formation to hydraulically fracture the geological formation.

Table 1 shows a composition of an example of untreated seawater. The components listed in Table 1 can be present in the untreated seawater as a species containing the listed component. For example, boron can be present in the untreated seawater as boric acid ($H_3BO_3$), and calcium can be present in the untreated seawater as dissolved ions ($Ca^{2+}$) or an inorganic compound containing calcium (such as calcium sulfate, $CaSO_4$).

TABLE 1

| Component/Attribute | Concentration/Value |
| --- | --- |
| Boron | <1 milligram/liter (mg/L) |
| Barium | <1 mg/L |
| Calcium | 618 mg/L |
| Iron | <1 mg/L |
| Magnesium | 2,108 mg/L |
| Potassium | 595 mg/L |
| Silicon | <1 mg/L |
| Sodium | 18,451 mg/L |
| Strontium | 11 mg/L |
| Chloride | 30,694 mg/L |
| Sulfate | 4,142 mg/L |
| Carbonate | <1 mg/L |
| Bicarbonate | 150 mg/L |
| Total Dissolved Solids (TDS) | 56,800 mg/L |
| Total Hardness | 10,200 mg/L |
| Potential of Hydrogen (pH) | 8.1 |

Table 2 shows a composition of an example of treated seawater. The components listed in Table 2 can be present in the treated seawater as a species containing the listed component. For example, barium can be present in the produced water as dissolved ions ($Ba^{2+}$).

TABLE 2

| Component/Attribute | Concentration/Value |
| --- | --- |
| Barium | 3,382 mg/L |
| Calcium | 24,900 mg/L |
| Magnesium | 1,830 mg/L |
| Potassium | 3,889 mg/L |
| Sodium | 78,100 mg/L |
| Strontium | 2,000 mg/L |
| Chloride | 160,000 mg/L |
| Sulfate | 190 mg/L |
| Carbonate | <1 mg/L |
| Bicarbonate | <1 mg/L |
| TDS | 292,000 mg/L |
| Total Hardness | 69,700 mg/L |
| pH | 3.6 |

In the following examples, untreated seawater and produced water have the attributes provided in Tables 1 and 2, respectively.

EXAMPLE 1

Figure 3:
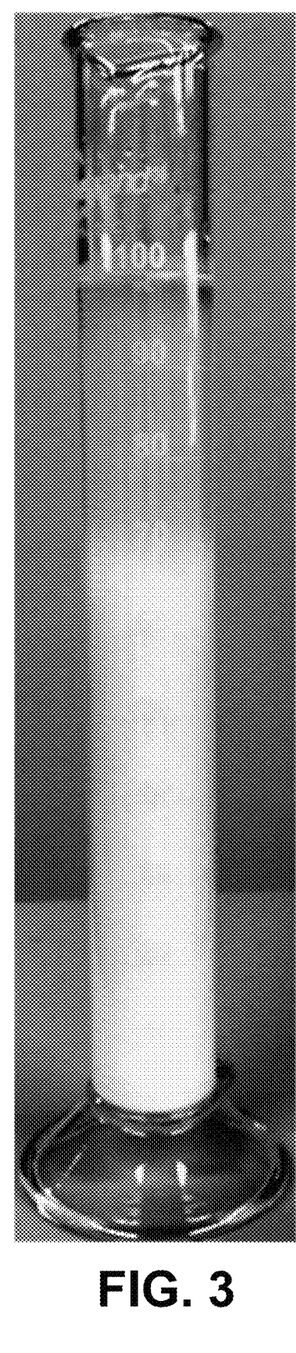
FIG. 3 shows a treated seawater of Example 1.

An aqueous solution with a concentration of approximately 88 pounds per each thousand gallons (where 1 pound per each thousand gallons is approximately 0.12 gram per liter) of barium chloride dihydrate ($BaCl_2.2H_2O$) was added to the untreated seawater while blending, such that the sulfate present in the untreated seawater precipitated as barium sulfate ($BaSO_4$). As one example, 1.053 grams (g) of $BaCl_2.2H_2O$ was added to the blender, and the untreated seawater was then added to the blender until the final volume was 100 milliliter (mL). The $BaCl_2.2H_2O$ dissolved quickly in the seawater, forming a solution containing particles of $BaSO_4$. The solution (that is, treated seawater) was poured into a 100 milliliter (mL) graduated cylinder and was left, so that the $BaSO_4$ precipitate could settle. FIG. 3 shows the treated seawater 10 minutes after being transferred to the 100 mL graduated cylinder. As seen in FIG. 3, the treated seawater still appeared to be cloudy, which can be interpreted to mean that the solution would require more time for the precipitate to settle.

EXAMPLE 2

Figure 4A:
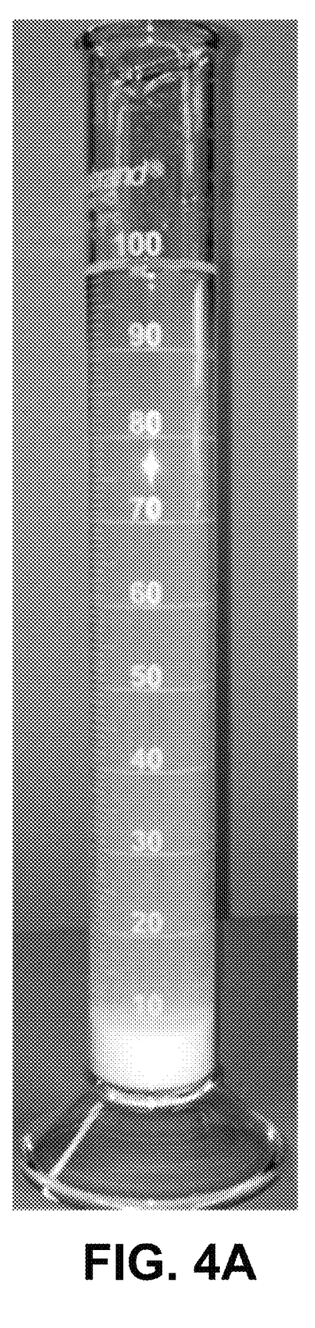
FIGS. 4A and 4B show a treated seawater of Example 2.
Figure 4B:
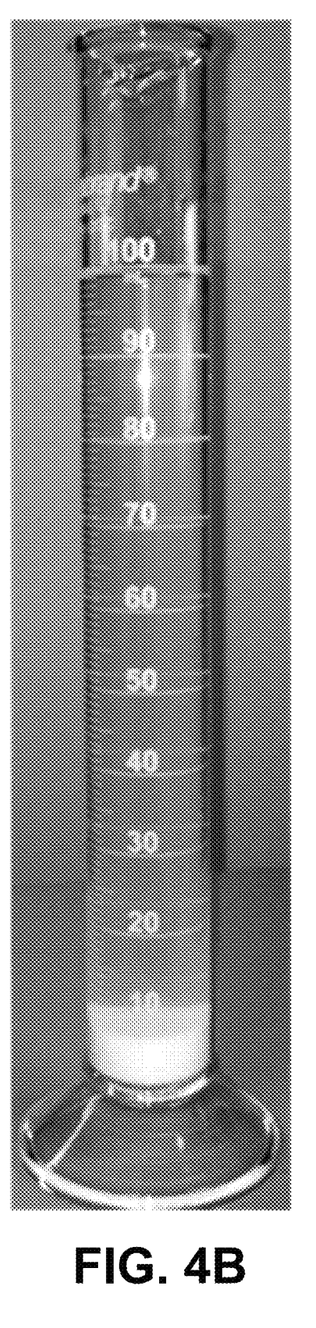

A solution was prepared by dissolving $BaCl_2.2H_2O$ in untreated seawater while blending (at a ratio of 1.053 g of $BaCl_2.2H_2O$ per 100 mL of final fluid, which is a concentration of approximately 88 pounds per each thousand gallons), such that the sulfate present in the untreated seawater precipitated as $BaSO_4$. The $BaCl_2.2H_2O$ dissolved quickly in the seawater, forming a solution containing particles of $BaSO_4$. Immediately after, flocculating agent was added while blending (for a resulting concentration of approximately 0.8 pounds of flocculating agent per each thousand gallons). In this example, the flocculating agent was HE® 150 Polymer by Drilling Specialties Company LLC. The solution (that is, treated seawater) was poured into a 100 mL graduated cylinder and was left so that the $BaSO_4$ precipitate could settle. FIG. 4A shows the treated seawater 1 minute after being transferred to the 100 mL graduated cylinder. FIG. 4B shows the treated seawater 10 minutes after being transferred to the 100 mL graduated cylinder. The efficacy of the flocculating agent in precipitating the sulfate in the untreated seawater can be determined by visual inspection or by turbidity measurement (that is, measurement of clarity of the solution).

The treated seawater was then separated from the flocculated precipitate (which had settled to the bottom of the 100 mL graduated cylinder). Calcium chloride (CaCl2) was added to the treated seawater to form a brine solution with a salt concentration of approximately 30 weight percent (%). Erucamidopropyl hydroxypropylsultaine (a viscoelastic surfactant, VES) was added to the brine solution at a volume ratio of approximately 5% (that is, volume of VES added to volume of brine solution). In this example, the VES was Armovis® EHS by Akzo Nobel Surface Chemistry LLC. The brine solution with the VES is also referred as the baseline fluid. The baseline fluid was heated to a temperature of approximately 350 degrees Fahrenheit (° F.) to mimic subterranean conditions. The viscosity of the baseline fluid was measured with a viscometer, following the American Petroleum Institute Recommended Practice Schedule 39 (API RP 39). The viscosity and temperature of the baseline fluid was recorded and is represented by the curve 508 and dashed curve 512, respectively, in FIG. 5. The left y-axis 502 is the viscosity of fluid measured in centipoise (cP). The right y-axis 510 is the temperature of fluid measured in ° F. The x-axis 504 is the time since the beginning of measurements in minutes and with time=0 approximately when heating begins.

Figure 5:
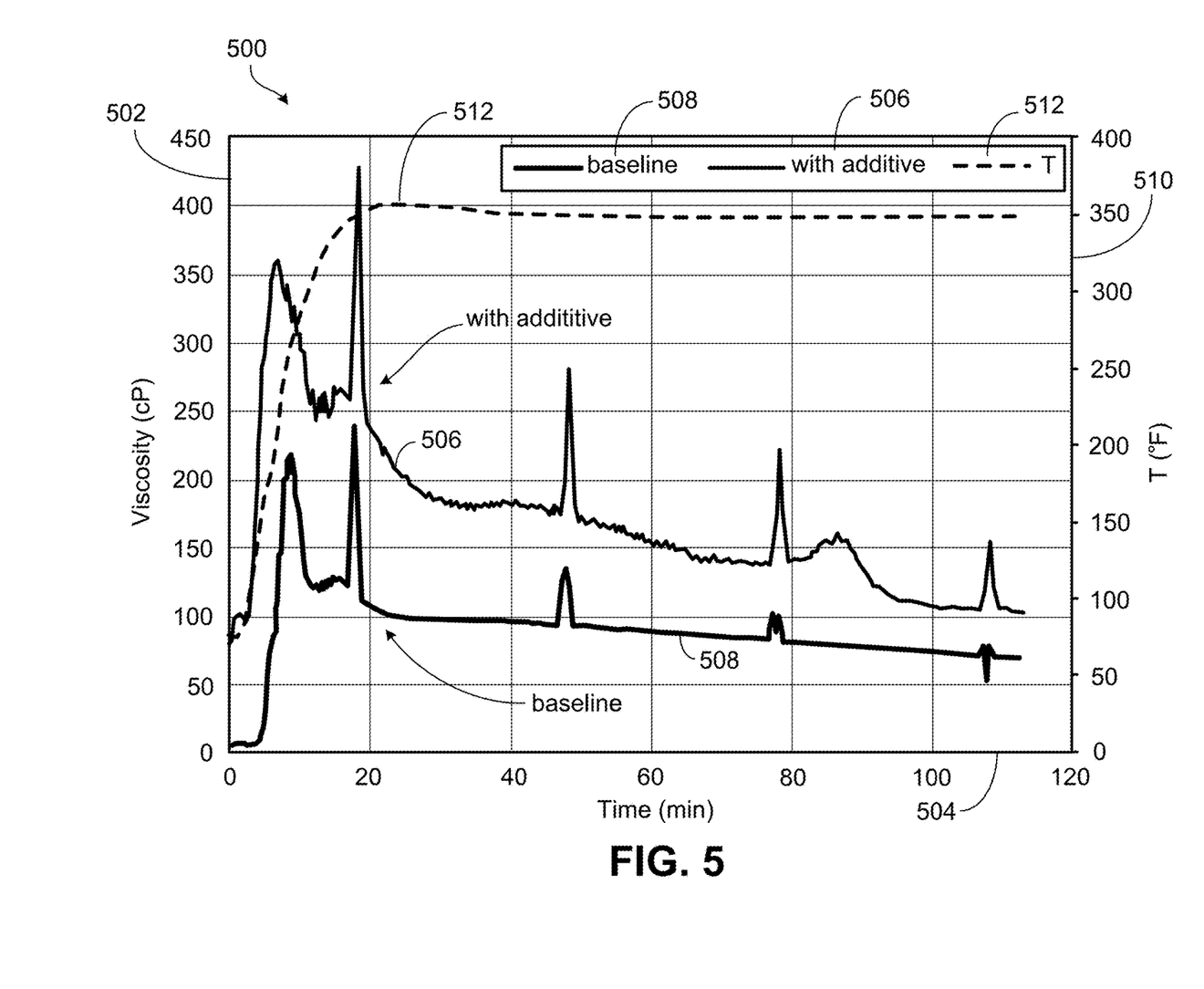
FIG. 5 shows a plot of viscosity and temperature vs. time of Example 2.

Another baseline fluid was prepared, but an additional amount of flocculating agent was added. Flocculating agent was added to the baseline fluid while mixing (for a resulting concentration of approximately 79 pounds of flocculating agent per each thousand gallons). The baseline fluid with additional flocculating agent was heated to a temperature of approximately 350° F. to mimic subterranean conditions. The viscosity of the baseline fluid with additional flocculating agent was measured with a viscometer, following the API RP 39. The viscosity of the baseline fluid with additional flocculating agent was recorded and is represented by the curve 506 in FIG. 5. As seen in FIG. 5, the flocculating agent exhibited synergistic characteristics and dual functionality with the treated seawater and enhanced the viscosity of the treated seawater. The flocculating agent's immediate use was to quickly precipitate the sulfate in the seawater as $BaSO_4$, but the flocculating agent also functioned as a viscosity-enhancing agent as well (as shown in FIG. 5). The fluid (baseline fluid with flocculating agent) was also compared to a control solution of seawater and flocculating agent (absence of VES). The control solution exhibited a viscosity of less than 20 cP at 350° F. In comparison, the synergy of VES and the flocculating agent in enhancing the viscosity of the fluid is shown in FIG. 5 (curve 506). FIG. 5 is a plot 500 of viscosity (cP) 502 and temperature (° F.) 510 over time (min) 504. Curve 508 is the viscosity of the baseline fluid. Curve 506 is the viscosity of the baseline fluid with the additive of additional amount of flocculating agent. The curve 512 is the temperature.

EXAMPLE 3

Figure 6A:
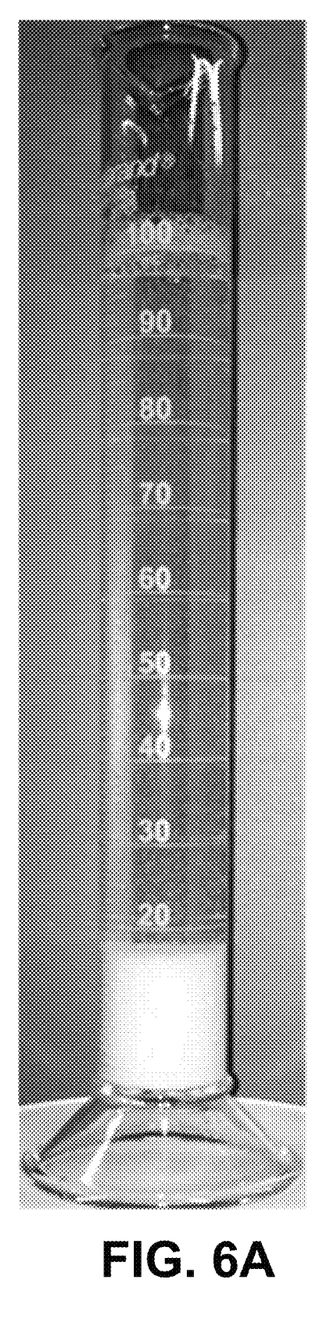
FIGS. 6A and 6B show a treated seawater of Example 3.
Figure 6B:
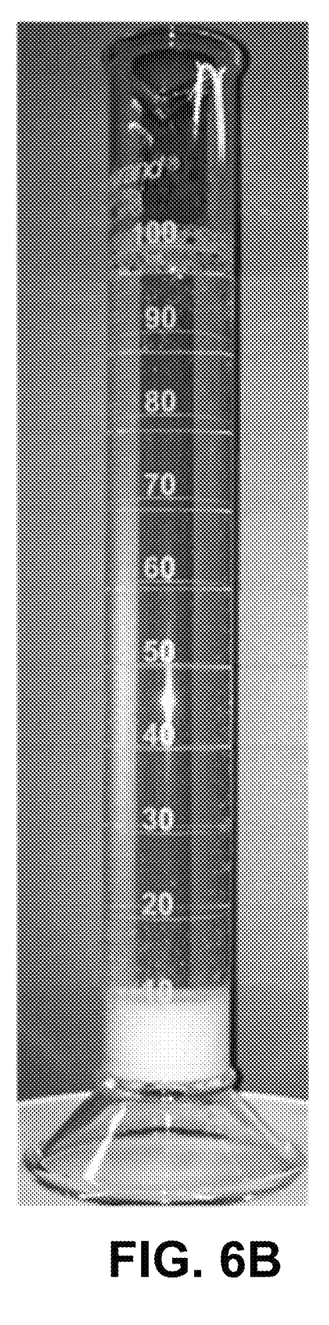

A solution was prepared by dissolving $BaCl_2.2H_2O$ in untreated seawater while blending (at a ratio of 1.053 g of $BaCl_2.2H_2O$ per 100 mL of final fluid, which is a concentration of approximately 88 pounds per each thousand gallons), such that the sulfate present in the untreated seawater precipitated as $BaSO_4$. The $BaCl_2.2H_2O$ dissolved quickly in the seawater, forming a solution containing particles of $BaSO_4$. Immediately after, solid partially hydrolyzed polyacrylamide terpolymer (flocculating agent) was added while blending for a resulting concentration of approximately 0.8 pounds of flocculating agent per each thousand gallons. The solution (that is, treated seawater) was poured into a 100 mL graduated cylinder and was left, so that the $BaSO_4$ precipitate could settle. FIG. 6A shows the treated seawater 1 minute after being transferred to the 100 mL graduated cylinder. FIG. 6B shows the treated seawater 10 minutes after being transferred to the 100 mL graduated cylinder.

EXAMPLE 4

Figure 7:
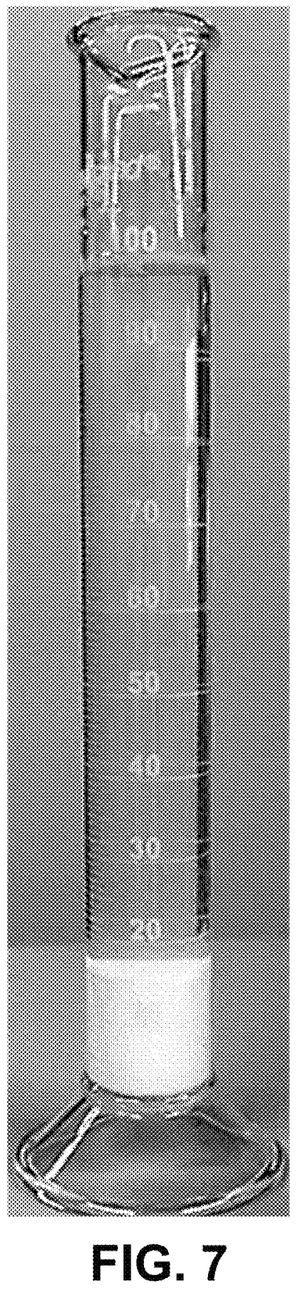
FIG. 7 shows a treated seawater of Example 4.

A solution was prepared by dissolving $BaCl_2.2H_2O$ in untreated seawater while blending (at a ratio of 1.053 g of $BaCl_2.2H_2O$ per 100 mL of final fluid, which is a concentration of approximately 88 pounds per each thousand gallons), such that the sulfate present in the untreated seawater precipitated as $BaSO_4$. The $BaCl_2.2H_2O$ dissolved quickly in the seawater, forming a solution containing particles of $BaSO_4$. Immediately after, solid sodium bicarbonate ($NaHCO_3$) was added while blending (for a resulting concentration of approximately 8 pounds of $NaHCO_3$ per each thousand gallons), resulting in a pH of approximately 7.3. Immediately after, aluminum sulfate additive was added while blending at a ratio of 2 parts additive per thousand parts total solution (parts per thousand by volume). The aluminum sulfate additive was prepared by adding 20 g of aluminum sulfate hydrate ($Al_2(SO_4)_3.H_2O$) to water, with a final volume of 100 mL. The solution (that is, treated seawater) was poured into a 100 mL graduated cylinder and was left, so that the $BaSO_4$ precipitate could settle. FIG. 7 shows the treated seawater 10 minutes after being transferred to the 100 mL graduated cylinder.

The treated seawater was then separated from the flocculated precipitate (which had settled to the bottom of the 100 mL graduated cylinder). $CaCl_2$ was added to the treated seawater to form a brine solution with a salt concentration of approximately 30 weight percent (%). Erucamidopropyl hydroxypropylsultaine (VES) was added to the brine solution at a volume ratio of approximately 5% (that is, volume of VES added to volume of brine solution). The brine solution with the VES was heated to a temperature of approximately 350° F. to mimic subterranean conditions. The viscosity of the baseline fluid was measured with a viscometer, following the American Petroleum Institute Recommended Practice Schedule 39 (API RP 39).

EXAMPLE 5

Figure 8A:
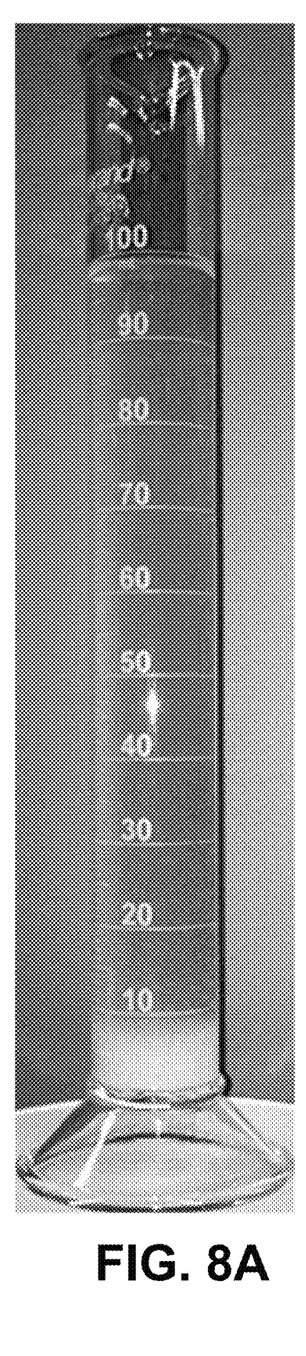
FIGS. 8A and 8B show a treated seawater of Example 5.
Figure 8B:
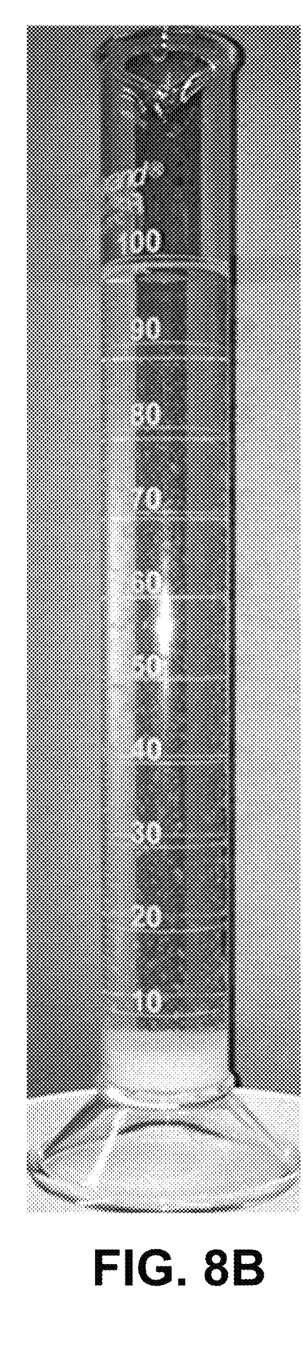

A solution was prepared by dissolving calcium chloride dihydrate ($CaCl_2.2H_2O$) in untreated seawater while blending (at a concentration of approximately 630 pounds per each thousand gallons), such that the sulfate present in the untreated seawater precipitated as $CaSO_4$. The $CaCl_2.2H_2O$ dissolved quickly in the seawater, forming a solution containing particles of $CaSO_4$. Immediately after, flocculating agent was added while blending (for a resulting concentration of approximately 0.8 pounds of flocculating agent per each thousand gallons). The solution (that is, treated seawater) was poured into a 100 mL graduated cylinder and was left, so that the $CaSO_4$ precipitate could settle. FIG. 8A shows the treated seawater 10 minutes after being transferred to the 100 mL graduated cylinder. FIG. 8B shows the treated seawater 1 hour after being transferred to the 100 mL graduated cylinder.

The treated seawater was then separated from the flocculated precipitate (which had settled to the bottom of the 100 mL graduated cylinder). $CaCl_2$ was added to the treated seawater to form a brine solution with a salt concentration of approximately 30 weight percent (%). Erucamidopropyl hydroxypropylsultaine (VES) was added to the brine solution at a volume ratio of approximately 5% (that is, volume of VES added to volume of brine solution). In this example, the VES was Armovis® EHS by Akzo Nobel Surface Chemistry LLC. The brine solution with the VES was heated to a temperature of approximately 350° F. to mimic subterranean conditions. The viscosity of the baseline fluid was measured with a viscometer, following the American Petroleum Institute Recommended Practice Schedule 39 (API RP 39).

The present disclosure describes technologies relating to hydrocarbon production including treating seawater. An example implementation of the subject matter described within this disclosure is a method that includes mixing seawater with an additive to form a first mixture and mixing the first mixture with a flocculating agent to form a second mixture, in which the additive can precipitate sulfate from the seawater, and the flocculating agent can agglomerate the sulfate precipitates. Aspects of the example implementation, which can be combined with the example implementation alone or in combination, include the following. The method can include separating the second mixture from the sulfate precipitates. The additive can precipitate crystalline sulfates. The seawater can include untreated seawater. The seawater does not include a scale inhibitor. The flocculating agent can include a polymer, a copolymer, aluminum sulfate hydrate ($Al2(SO4)3.H2O$), or combinations of these. The flocculating agent can include a viscosifier, a friction reducer, or combinations of both. The additive can include produced water, brine, brackish water, or combinations of these. The additive can include a hydrate, a divalent cation, or combinations of both. The hydrate can be barium chloride dihydrate (BaCl2.2H2O), calcium chloride dihydrate (CaCl2.2H2O), or combinations of both. The method can include dissolving a salt in the first mixture, in which the salt can increase a potential of hydrogen (pH) of the first mixture. The pH of the first mixture can be between 7 and 9.

Another example implementation of the subject matter described within this disclosure is a method that includes forming a fracturing fluid from seawater, in which forming the fracturing fluid includes mixing the seawater with an additive to form a first mixture and mixing the first mixture with a flocculating agent to form a second mixture, where the additive can precipitate sulfate from the seawater, and the flocculating agent can agglomerate the sulfate precipitates; and delivering the fracturing fluid to a subterranean zone. Aspects of the example implementation, which can be combined with the example implementation alone or in combination, include the following. The method can include separating the second mixture from the sulfate precipitates. The flocculating agent can include a viscosifier, a friction reducer, or combinations of both. The additive can include produced water, brine, brackish water, or combinations of these. The method can include dissolving a salt in the first mixture, in which the salt can increase a pH of the first mixture. The pH of the first mixture can be between 7 and 9. The additive can include a hydrate, a divalent cation, or combinations of both. The hydrate can be barium chloride dihydrate (BaCl2.2H2O), calcium chloride dihydrate (CaCl2.2H2O), or combinations of both.

While this specification contains many specific implementation details, these should not be construed as limitations on the scope of the subject matter or on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some implementations, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this disclosure. Other changes, substitutions, and alterations are also possible without departing from the spirit and scope of this disclosure.

What is claimed is:

1. A method of hydraulic fracturing a geological formation, comprising:

receiving seawater for the hydraulic fracturing, the seawater comprising a sulfate concentration of at least 3000 milligrams per liter (mg/L);

mixing an additive with the seawater to precipitate sulfate in the seawater;

mixing a flocculating agent with the seawater to agglomerate sulfate precipitate in the seawater;

removing sulfate precipitate from the seawater to give treated seawater; and injecting fracturing fluid comprising the treated seawater through a wellbore into the geological formation to hydraulically fracture the geological formation.

2. The method of claim 1, comprising further adding the flocculating agent to the treated seawater.

3. The method of claim 1, comprising further adding the flocculating agent to the treated seawater to increase viscosity of the treated seawater, thereby increasing the viscosity of the treated seawater by adding the flocculating agent to the treated seawater.

4. The method of claim 1, comprising adding a viscoelastic surfactant (VES) and the flocculating agent to the treated seawater to increase viscosity of the treated seawater, wherein the viscosity of the treated seawater is greater with addition of the flocculating agent to the treated seawater than without addition of the flocculating agent to the treated seawater.

5. The method of claim 1, wherein receiving seawater comprises receiving the seawater at a well site comprising the wellbore, wherein mixing the additive with the seawater comprises mixing the additive with the seawater at the well site, and wherein the treated seawater comprises a sulfate concentration of less than 90 mg/L.

6. The method of claim 1, comprising further adding the flocculating agent to the treated seawater to increase viscosity of the treated seawater, wherein the flocculating agent increases the viscosity of the treated seawater, and wherein the treated seawater comprises a sulfate concentration less than 90 mg/L.

7. The method of claim 1, wherein the flocculating agent increases viscosity of the treated seawater.

8. The method of claim 1, wherein the seawater received does not comprise a scale inhibitor, wherein the additive comprises produced fluid from a well, wherein the additive comprises barium chloride (BaCl2), calcium chloride (CaCl2), barium chloride dihydrate (BaCl2.2H2O), or calcium chloride dihydrate (CaCl2.2H2O), or any combinations thereof, and wherein the sulfate precipitate comprises barium sulfate (BaSO4) or calcium sulfate (CaSO4), or a combination thereof.

9. The method of claim 1, wherein the flocculating agent comprises viscosifier that increases viscosity of the treated seawater.

10. A method of hydraulic fracturing a geological formation, comprising:

forming a fracturing fluid from seawater, the seawater comprising a sulfate concentration of at least 3000 milligrams per liter (mg/L), and wherein the forming comprises:

mixing the seawater with an additive to form a first mixture to precipitate sulfate from the seawater;

mixing the first mixture with a flocculating agent to form a second mixture to agglomerate the sulfate precipitates; and separating the second mixture from sulfate precipitates; and delivering the fracturing fluid comprising the second mixture to a subterranean zone.

11. The method of claim 10, wherein the forming further comprises dissolving a salt in the first mixture to increase potential of hydrogen (pH) of the first mixture to between 7 and 9, thereby increasing the pH of the first mixture to between 7 and 9 by dissolving the salt in the first mixture, wherein to precipitate sulfate comprises precipitating crystalline sulfates via the additive, wherein the additive comprises produced water, brine, or brackish water, or combinations thereof, and wherein the flocculating agent comprises a polymer, a copolymer, or aluminum sulfate hydrate (Al2(SO4)3.H2O), or any combinations thereof.

12. The method of claim 10, wherein the flocculating agent increases viscosity of the treated seawater.

13. The method of claim 10, wherein the seawater does not include a scale inhibitor, wherein the additive comprises a hydrate or a divalent cation, or a combination thereof, and wherein the hydrate is barium chloride dihydrate (BaCl2.2H2O) or calcium chloride dihydrate (CaCl2.2H2O), or a combination thereof.

14. The method of claim 10, comprising further adding the flocculating agent to the second mixture to increase viscosity of the second mixture, thereby increasing viscosity of the second mixture by adding the flocculating agent to the second mixture.

15. The method of claim 10, comprising further adding the flocculating agent to the second mixture.

16. The method of claim 15, wherein the second mixture comprises a sulfate concentration less than 90 mg/L.

17. The method of claim 10, comprising adding a viscoelastic surfactant (VES) to the second mixture to increase viscosity of the second mixture, wherein the VES increases the viscosity of the second mixture.

18. The method of claim 17, comprising further adding the flocculating agent to the second mixture to further increase viscosity of the second mixture, wherein the flocculating agent increases the viscosity of the second mixture, wherein the viscosity of the second mixture with the VES and the flocculating agent is greater than the viscosity of the second mixture with the VES and without the flocculating agent.

19. A hydraulic-fracturing system comprising:

a seawater treatment system comprising a mixer to combine an additive with seawater to precipitate sulfate in the seawater and to combine a flocculating agent with the seawater to agglomerate sulfate precipitate, the seawater treatment system to separate sulfate precipitate from the seawater to give treated seawater and further to combine additional flocculating agent with the treated seawater; and a pump to inject fracturing fluid comprising the treated seawater through a wellbore into a geological formation to hydraulically fracture the geological formation.

20. The system of claim 19, wherein the seawater comprises untreated seawater, wherein the seawater comprises a sulfate concentration of at least 3000 milligrams per liter (mg/L), and wherein the additive comprises produced fluid from a well.

21. The system of claim 19, wherein the seawater does not comprise a scale inhibitor, and wherein the treated seawater comprises a sulfate concentration of less than 90 mg/L.

* * * * *